United States Patent [19]

Lammers

[11] Patent Number: 6,012,416
[45] Date of Patent: Jan. 11, 2000

[54] HOG HOLDER APPARATUS

[75] Inventor: Jon G. Lammers, Kansas City, Mo.

[73] Assignee: Stone Manufacturing & Supply Co., Inc., Kansas City, Mo.

[21] Appl. No.: 09/219,562

[22] Filed: Dec. 23, 1998

Related U.S. Application Data

[60] Provisional application No. 60/068,602, Dec. 23, 1997.

[51] Int. Cl.[7] .................................................. A01K 15/00
[52] U.S. Cl. ........................ 119/804; 119/803; 294/19.1; 606/121
[58] Field of Search ..................................... 119/801, 802, 119/803, 804; 294/19.1, 19.3, 82.17; 606/121, 122, 136, 124

[56] References Cited

U.S. PATENT DOCUMENTS

| | | | |
|---|---|---|---|
| 643,673 | 2/1900 | Morris | 119/804 |
| 1,393,527 | 10/1921 | Guthrie | 119/804 |
| 1,478,999 | 1/1924 | Johnson | 119/804 |
| 1,713,624 | 5/1929 | Reeves | 119/804 |
| 1,763,181 | 6/1930 | Reeves | 119/804 |
| 2,704,052 | 3/1955 | Wood | 119/804 |
| 2,776,645 | 1/1957 | Dooley | 119/804 |
| 3,949,514 | 4/1976 | Ramsey | 43/87 |

OTHER PUBLICATIONS

Stone Livestock Identification and Show Equipment catalog, p. 8, identifying Product No. 27600 (undated).

*Primary Examiner*—Michael J. Carone
*Assistant Examiner*—James S. Bergin
*Attorney, Agent, or Firm*—Shook, Hardy & Bacon L.L.P.

[57] ABSTRACT

A hog holding apparatus is provided with a loop formed at an end of a rigid elongated tube. The tube is hollow and a rod is slidably positioned within the tube and is attached to one end of the rope that forms the loop. The other end of the rope is secured to a flange formed at the end of the tube. The rod extends through a locking plate that is captured within a j-shaped flange positioned at the opposite end of the tube. The locking plate is spring-biased toward a locked position that binds against the rod prevents further extension of the rod within the tube, which would cause a corresponding increase in the size of the loop. The locking plate may be released by pulling on the rod or by manually manipulating the locking plate to overcome the biasing force. A roughened or threaded surface on the rod reduces slippage of the rod against the locking plate when the locking plate is in the locked position.

8 Claims, 1 Drawing Sheet

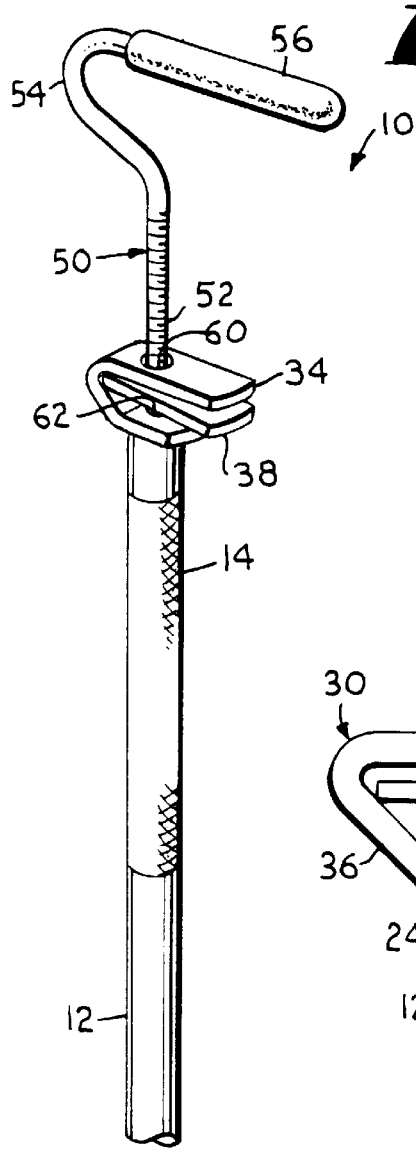
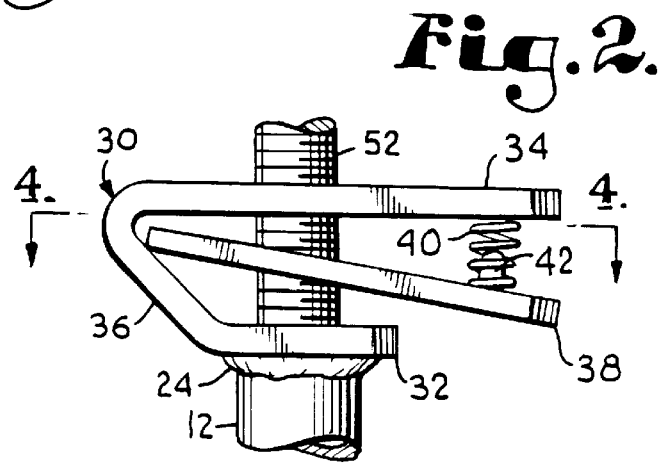
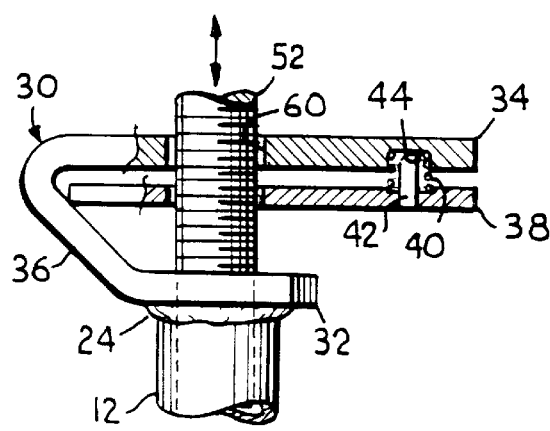
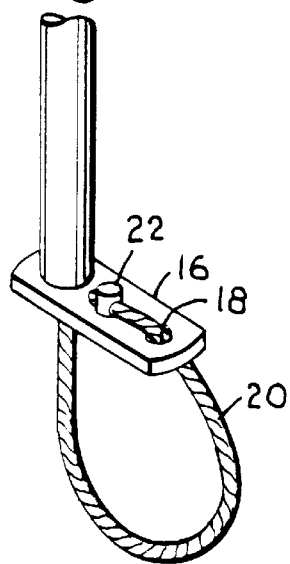
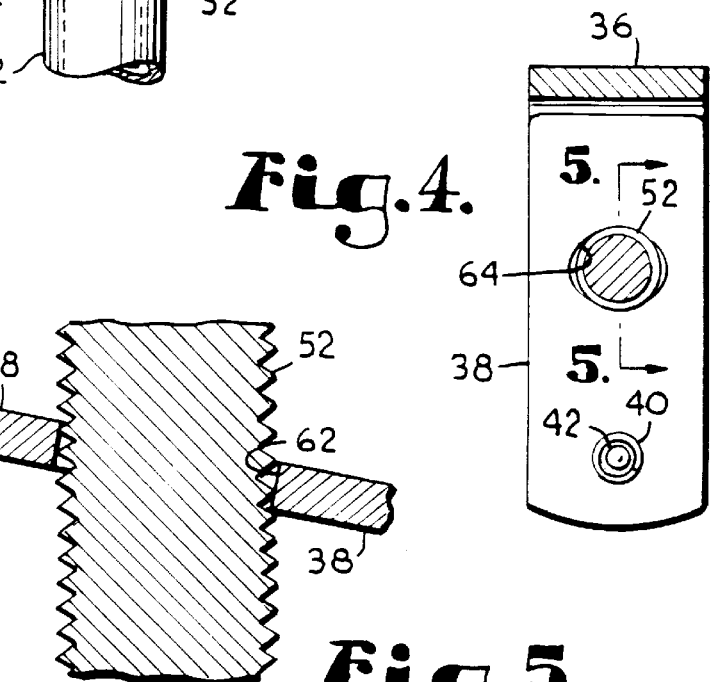

HOG HOLDER APPARATUS

CROSS-REFERENCE TO RELATED APPLICATION

This application claims the benefit of U.S. Provisional Application No. 60/068,602 filed Dec. 23, 1997.

STATEMENT REGARDING FEDERALLY SPONSORED RESEARCH

Not applicable.

BACKGROUND OF THE INVENTION

This invention relates in general to a hog holder apparatus and, more particularly, to a hog holder apparatus having an improved locking device for preventing a threaded rod from being advanced into a hollow tube.

Hog holder devices are conventionally used to restrain hogs by grasping the snout of the hog with a rope loop that can be pulled tight to securely grasp the snout. The rope loop typically is formed at the end of a rigid elongated tube by fixing one end of the rope to a flange projecting from an end of the tube. The rope is then threading the hollow interior of the tube and is fixed at its other end to a rod that is extendable within the hollow tube. Extension and retraction of the rod within the tube varies the size of the rope loop accordingly.

Conventional hog holder devices typically include a locking mechanism that must be released before the rope loop can be loosened. This locking mechanism is desirable because it releasably locks the rope loop in place once it has been applied to the hog's snout. The user of the hog holder device is then able to restrain the hog merely by grasping the hollow tube, leaving the other hand free to administer injections or otherwise attend to the hog. The locking mechanism typically is formed by a rectangular locking plate that is captured within a curved flange at the end of the hollow tube opposite from the rope loop. The extendable rod passes through a hole in the locking plate, with the hole being sized slightly larger than the diameter of the rod. When the locking plate is positioned perpendicular to longitudinal axis of the rod, the rod may be freely advanced and retracted longitudinally through the hole in the locking plate. However, when the locking plate is tilted slightly from the perpendicular orientation in relation to the axis of the rod, the rod binds against the portion of the locking plate surrounding the hole and the locking plate, in turn, engages the end of the tube. The rod is thereby locked against further advancement into the tube and corresponding increase in the size of the rope loop until such time as the locking plate is manually returned to the perpendicular released position. The locking plate is positioned in the curved flange in a manner such that the locking plate is normally maintained in the tilted, locked position. However, because the locking plate is free to move away from the tube end within the confines of the curved flange, the rod may still be retracted within the tube to tighten the rope loop by exerting a retracting force on the rod without having to manually manipulate the locking plate back to the perpendicular position.

While hog holding devices of the type described above are generally reliable, in some instances the rope loop may inadvertently be permitted to expand when the locking plate slips along the smooth surface of the rod, such as when moisture is present on the rod, or when the locking plate is displaced from the tilted, locked position. A need has thus developed for a hog holding device that more securely engages the locking plate against the rod to prevent accidental release of the hog.

SUMMARY OF THE INVENTION

The hog holder apparatus disclosed herein provides an improved locking device including a spring-biased locking plate that cooperates with the threaded rod to alternate between a locked position and an unlocked position. The threaded rod can be retracted from the hollow tube in either the locked or the unlocked position. However, the threaded rod cannot be advanced into the tube unless the apparatus is in the unlocked position.

Accordingly, it is an object of the present invention to provide a hog holder apparatus having a spring-biased locking plate for improved locking and unlocking operation.

It is a further object of the present invention to provide a hog holder apparatus having a threaded rod that interacts with a spring-biased locking plate for improved engagement in the locked position.

It is another object of the present invention to provide a hog holder apparatus wherein a J-shaped flange is provided at the upper end of a hollow shaft for receiving a locking plate. A related object of the present invention is to provide a J-shaped upper flange having an upwardly offset curved portion for receiving one end of the locking plate.

These and other related objects of the present invention will become readily apparent upon further review of the specification and drawings. To accomplish the objects of the present invention, a hog holder apparatus is provided comprising a hollow tube coupled with a J-shaped flange at the upper end of the tube and coupled with a planar flange at the lower end of the tube, an elongated rod adapted to be reciprocated within the hollow tube for tightening and loosening a loop fastened to the lower flange, and a spring-biased locking plate adapted to receive and engage a threaded rod so that the rod may not be advanced into the tube when the spring is released but is free to move when the spring is compressed. In a preferred embodiment, the J-shaped upper flange presents an upwardly offset curved portion that is adapted to receive one end of the locking plate so the flange will prevent the locking plate from moving from a diagonal or locked position to a horizontal or unlocked position when pressure is exerted on the rod to advance it into the tube.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of the hog holder apparatus of the present invention;

FIG. 2 is an enlarged, fragmentary side elevational view of a locking device in accordance with the present invention wherein the locking device is in a locked position;

FIG. 3 is a fragmentary side elevation view of the locking device of FIG. 2 with the locking device in an unlocked position and with arrows indicating vertical movement of the threaded rod;

FIG. 4 is a sectional view of the locking device of the present invention taken along line 4—4 of FIG. 2; and FIG. 5 is a sectional view of the locking plate and threaded rod of the present invention taken along line 5—5 of FIG. 4.

DETAILED DESCRIPTION OF THE INVENTION

Referring to the drawings in greater detail, and initially to FIG. 1, the hog holder apparatus of the present invention is designated generally by reference numeral 10. The hog holder 10 comprises a hollow tube 12 having a knurled surface 14. The lower end of the tube 12 terminates at a lower flange 16 having a hole 18 through which a loop 20 of rope constructed of metal, fabric, polymeric or other desired material passes before terminating at fastener 22. A welded joint 24 (FIG. 2) connects the upper end of tube 12 with a J-shaped upper flange 30. Lower flange 16 may also be connected with tube 12 with a welded joint.

As shown in FIGS. 2 and 3, flange 30 includes a plate-like bottom portion 32, an elongated plate-like top portion 34 and a curved portion 36. A locking plate 38 is coupled to top portion 34 by a spring 40. Plate 38 presents a nub 42 for receiving the lower end of the spring, and top portion 34 presents a recess 44 for receiving the upper end of spring 40. Recess 44 is also adapted to receive the nub 42 when the spring is compressed as shown in FIG. 3.

Referring back to FIG. 1, a rod 50 is adapted to reciprocate within the bore of tube 12 so as to tighten and loosen loop 20, which is fastened at one end to the bottom of rod 50 and at the other end to flange 16. The rod includes an elongated, threaded portion 52 and an upper curved portion 54 which is used as a handle and covered by a grip 56. Tube 12, flanges 16 and 30, plate 38, spring 40 and rod 50 are all preferably constructed of metal. Loop 20 is preferably a metal rope or cable.

With reference to FIGS. 1 and 3, it can be seen that top portion 34 and bottom portion 32 present holes 60 and 62, which are aligned with the bore in tube 12 so that rod 50 may reciprocate freely through upper flange 30. Likewise, locking plate 38 presents a hole 64 (FIG. 4), which is aligned with holes 60 and 62 when the locking plate is in the horizontal or unlocked position shown in FIG. 3. Consequently, when plate 38 is in an unlocked position, the threaded portion of rod 50 reciprocates freely through both flange 30 and locking plate 38. However, when spring 40 is released, plate 38 assumes a diagonal or locked position in which it engages threaded portion 52 and limits vertical movement of rod 50. The engagement of locking plate 38 and threaded portion 52 of rod is best shown in FIG. 5. In a preferred embodiment, curved portion 36 is upwardly offset so that it is adapted to receive one end of locking plate 38 to prevent the advancement of rod 50 into tube 12 when plate 38 is in the locked position. However, the structure of curved portion 36 does not prevent retraction of rod 50 from tube 12 when plate 38 is in the locked position.

In operation, hog holder 10 is used to control or restrain hogs and other such animals by securing the loop around the hog's snout. First, rod 50 is advanced into the hollow tube to increase the length of loop 20 that is exposed. With one hand on grip 56 and the other hand grasping the knurled portion of tube 12, the apparatus is maneuvered until the loop is placed over the snout. Then, the rod is immediately retracted from the tube by pulling the grip upwardly until the loop is sufficiently tightened around the snout. The loop cannot be loosened so long as the apparatus remains in the locked position. Eventually, the hog is released by pressing the locking plate 38 against the spring 40 so that the apparatus is in the unlocked position.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the disclosure.

Since many possible embodiments may be made of the invention without departing from the scope thereof, it is to be understood that all matter herein set forth is to be interpreted as illustrative and not in a limiting sense.

Having thus described the invention, what is claimed is:

1. A hog holding apparatus comprising:

an elongated hollow tube having first and second opposed ends;

an elongated rod positioned at least in part within the hollow tube and extendable and retractable within the hollow tube;

a loop formed at the first end of the hollow tube and operably coupled with the elongated rod so that extension of the rod within the hollow tube increases the size of the loop and retraction of the rod within the hollow tube decreases the size of the loop;

a j-shaped flange positioned at the second end of the hollow tube and having at least one opening through which the rod slidably extends;

a locking plate positioned for pivotal movement within the j-shaped flange and having an opening through which the rod extends, the locking plate being movable between a locked position in which the locking plate binds against the rod to prevent extension of the rod within the hollow tube and a released position permitting said extension of the rod; and a biasing member exerting a biasing force on the locking plate to urge movement of the locking plate in the direction of the locked position, said locking plate being moveable to the released position by manipulation of the locking plate to overcome the biasing force.

2. The apparatus of claim 1, including a threaded surface on said rod along an area where the locking plate binds against the rod.

3. The apparatus of claim 2, wherein the loop is formed from a length of rope having opposed ends, one of said rope ends being attached to the rod within the hollow tube and the other of said rope ends being secured to a flange positioned at the first end of the hollow tube.

4. The apparatus of claim 3, wherein the biasing member is a spring positioned between the j-shaped flange and the locking plate.

5. A hog holding apparatus comprising:

an elongated hollow tube having first and second opposed ends;

an elongated rod positioned at least in part within the hollow tube and extendable and retractable within the hollow tube and having a handle positioned at a free end of the rod, said rod having a threaded surface along at least a portion of its length;

a loop formed at the first end of the hollow tube and operably coupled with the elongated rod so that extension of the rod within the hollow tube increases the size of the loop and retraction of the rod within the hollow tube decreases the size of the loop;

a j-shaped flange positioned at the second end of the hollow tube and having at least one opening through which the rod slidably extends;

a locking plate positioned for pivotal movement within the j-shaped flange and having an opening through which the rod extends, the locking plate being movable between a locked position in which the locking plate binds against the threaded surface of the rod to prevent extension of the rod within the hollow tube and a released position permitting said extension of the rod; and a spring positioned between the j-shaped flange and the locking plate and operating to exert a biasing force on the locking plate to urge movement of the locking plate in the direction of the locked position, said locking plate being moveable to the released position by manipulation of the locking plate to overcome the biasing force.

6. The apparatus of claim 5, wherein the loop is formed from a length of rope having opposed ends, one of said rope ends being attached to the rod within the hollow tube and the other of said rope ends being secured to a flange positioned at the first end of the hollow tube.

7. A hog holding apparatus comprising:

an elongated hollow tube having first and second opposed ends;

an elongated rod positioned at least in part within the hollow tube and extendable and retractable within the hollow tube, said rod having a threaded surface at least in part;

a length of rope having opposed ends, one of said rope ends being attached to the rod within the hollow tube and the other of said rope ends being secured to a flange positioned at the first end of the hollow tube, said rope forming a loop at the first end of the hollow tube which is operably coupled with the elongated rod so that extension of the rod within the hollow tube increases the size of the loop and retraction of the rod within the hollow tube decreases the size of the loop;

a locking plate positioned at the second end of the hollow tube and having an opening through which the rod extends, the locking plate movable between a locked position in which the locking plate binds against the threaded surface of the rod to prevent extension of the rod within the hollow tube and a released position permitting said extension of the rod;

a j-shaped flange positioned at the second end of the hollow tube wherein the rod extends through one or more openings in the j-shaped flange and the locking member is captured within the j-shaped flange for pivotal movement between the locked and released positions; and a biasing member exerting a biasing force on the locking plate to urge movement of the locking plate in the direction of the locked position, said locking plate being moveable to the released position by manipulation of the locking plate to overcome the bias force.

8. The apparatus of claim 7, wherein the biasing member is a spring positioned between the j-shaped flange and the locking plate.

* * * * *